(12) United States Patent
Chevalier et al.

(10) Patent No.: US 7,940,856 B2
(45) Date of Patent: May 10, 2011

(54) METHOD AND DEVICE FOR SYNCHRONIZING RECTILINEAR OR QUASI-RECTILINEAR LINKS IN THE PRESENCE OF INTERFERENCE

(75) Inventors: Pascal Chevalier, Courbevoie (FR); Pipon Francois, Paris (FR); François Delaveau, Le Perreux Sur Marne (FR)

(73) Assignee: Thales (FR)

( * ) Notice: Subject to any disclaimer, the term of this patent is extended or adjusted under 35 U.S.C. 154(b) by 770 days.

(21) Appl. No.: 11/816,906

(22) PCT Filed: Feb. 20, 2006

(86) PCT No.: PCT/EP2006/060102
§ 371 (c)(1),
(2), (4) Date: Jan. 31, 2008

(87) PCT Pub. No.: WO2006/089875
PCT Pub. Date: Aug. 31, 2006

(65) Prior Publication Data
US 2008/0226003 A1 Sep. 18, 2008

(30) Foreign Application Priority Data

Feb. 22, 2005 (FR) ..................... 05 01784

(51) Int. Cl.
*H04L 27/00* (2006.01)
(52) U.S. Cl. ......... 375/295; 375/130; 375/135; 375/354
(58) Field of Classification Search .................. 375/295, 375/354
See application file for complete search history.

(56) References Cited

U.S. PATENT DOCUMENTS 7,336,734 B2 * 2/2008 Ferreol et al. .................. 375/340
7,787,571 B2 * 8/2010 Ferreol et al. .................. 375/324

FOREIGN PATENT DOCUMENTS

EP          0 665 665 A1    8/1995
EP          1 359 685 A1    11/2003

OTHER PUBLICATIONS

Picinbono B et al. "Widely Linear Estimation With Complex Data"., IEEE Transactions on Signal Processing, IEEE, Inc. New York, US, vol. 43, No. 8, pp. 2030-2033, XP000526122, ISSN: 1053-587X.

(Continued)

*Primary Examiner* — Shuwang Liu
*Assistant Examiner* — Dhaval Patel
(74) *Attorney, Agent, or Firm* — Lowe Hauptman Ham & Berner, LLP (57) ABSTRACT

A method of synchronizing a substantially rectilinear signal being propagated through an unknown channel, in the presence of unknown substantially rectilinear interferences, received by an array of N sensors, in which a known training sequence s(nT) is used comprising K symbols and sampled at the symbol rate T (s(nT), $0 \leq n \leq K-1$), characterized in that, based on observations x((n+l/p)T) over the duration of the training sequence, where p=T/Te is an integer and Te the sampling period, a virtual observation vector $\tilde{X}((n+l/p)T)=[x((n+l/p)T)^T, x((n+l/p)T)^{\dagger}]^T$ is defined, as well as a decision criterion or decision statistic taking into account the second-order non-circular nature of the interferences, by using the first and second correlation matrices of the virtual observation vector $\tilde{X}((n+l/p)T)$.

11 Claims, 2 Drawing Sheets

Computation and application of the widely-linear Wiener filter
-> rejection of interferences
-> rejection of decorrelated paths Computation of the sufficient statistic

OTHER PUBLICATIONS

S. Bensley, B. Aazhang, Subspace-based channel estimation for CDMA system, IEEE Trans Communication, vol. 44, pp. 1009-1020, Aug. 1996.

S. Bensley, B. Aazhang, Maximum Likelihood synchronization of a single user for CDMA systems, IEEE Trans Communication, vol. 46, pp. 392-399, Mar. 1998.

L.E. Brennan, I.S. Reed, "An adaptive array signal processing algorithm for communications", IEEE Trans. Aerosp. Electronic Systems, vol. 18, No. 1, pp. 124-130, Jan 1982.

R.T. Compton, "An adaptive array in a spread spectrum communication system", Proc IEEE, vol. 66, No. 3, pp. 289-298, Mar. 1978.

D.M. Duglos, R.A. Scholtz, "Acquisition of spread spectrum signals by an adaptive array", IEEE Trans. Acou. Speech. Signal Proc., vol. 37, No. 8, pp. 1253-1270, Aug. 1989.

P.A. Laurent, "Exact and approximate construction of digital phase modulations by superposition of amplitude modulated pulses (AMP)", IEEE Trans.on Communications, vol. 34, No. 2, pp. 150-160, Feb. 1986.

B. Picinbono, P. Chevalier, "Widely linear estimation with complex data", IEEE Trans. Signal Processing, vol. 43, No. 8, pp. 2030-2033, Aug. 1995.

J.H. Winters, "Spread spectrum in a four phase communication system employing adaptive antennas", IEEE Trans. on Communications, vol. 30, No. 5, pp. 929-936, May 1982.

H.L. Van Trees, "Detection, Estimation and Modulation Theory", John Wiley and Sons, 1971. (Book).

* cited by examiner

METHOD AND DEVICE FOR SYNCHRONIZING RECTILINEAR OR QUASI-RECTILINEAR LINKS IN THE PRESENCE OF INTERFERENCE

CROSS REFERENCE TO RELATED APPLICATIONS

The present Application is based on International Application No. PCT/EP2006/060102, filed Feb. 20, 2006 which in turn corresponds to France Application No. 05 01784, filed Feb. 22, 2005, and priority is hereby claimed under 35 USC §119 based on these applications. Each of these applications are hereby incorporated by reference in their entirety into the present application.

FIELD OF THE INVENTION

The invention relates notably to a method and a device for synchronizing a rectilinear or quasi-rectilinear link in the presence of interferences of the same type, from one or more receiving antennas.

It can be used notably to synchronize, from the same antenna, a link disturbed by interference, the interference possibly being of the same type.

In this description, the term "rectilinear link" is used to denote a link for which the transmitted signal is rectilinear, that is, that it has a real complex envelope, or a one-dimensional modulation, as is the case for signals with amplitude modulation AM, Amplitude Shift Keying ASK or binary phase shift keying BPSK modulation. A link is said to be quasi-rectilinear if the transmitted signal is quasi-rectilinear, that is, if the real part of its complex envelope contains all the information conveyed by this signal. These quasi-rectilinear signals include, in particular, the MSK or GMSK signals having been subjected to a derotation preprocessing operation.

BACKGROUND OF THE INVENTION

The invention applies notably to systems using modulations that are rectilinear, or rendered quasi-rectilinear after preprocessing, such as certain friend-foe identification systems (IFF in modes S and 5) or even certain radio communication networks (cellular or otherwise) such as the Global System for Mobile communications GSM, for which the main source of interferences is the network itself.

The problem of synchronizing the links in the presence of interference is a problem that has been given enormous attention over the last two decades, mainly in the fight against co-channel interference in the context of multiple-access networks relying on a code or CDMA (code-division multiple access).

These techniques operate on the basis of one [1-2] or several [3-5] antennas [9] in reception. However, the single-sensor techniques are all very specific to the CDMA context and cannot be considered in F/TDMA networks (networks with multiple or time-division multiple access, with slow (or quick) time-frequency hopping (F-TDMA)). Also, the multiple-sensor techniques proposed in [4] [9] are similar whereas those derived from [3] also remain specific to CDMA networks in as much as the spreading codes are assumed to be not modulated randomly by information symbols. In fact, only the maximum likelihood approach proposed in [5] can be envisaged outside the CDMA context. However, this approach presupposes stationary Gaussian interferences, which are therefore second-order circular, and does not use any a priori particular ones of the interferences. In particular, the approach proposed in [5] becomes sub-optimal in the presence of second-order non-circular interferences, for which the second correlation function is not identically zero, a property characteristic of the GMSK signals used by the GSM networks in particular, which become quasi-rectilinear after preprocessing.

SUMMARY OF THE INVENTION

The subject of the invention relates notably to a method and a device for synchronizing a link that is rectilinear or rendered quasi-rectilinear after preprocessing, exploiting the potentially non-circular nature of the interferences and particularly powerful for so-called internal interferences which are themselves rectilinear or quasi-rectilinear after preprocessing.

The idea of the invention is notably to exploit the knowledge of a training sequence included in the bursts of the link for synchronization purposes in particular, and applies an optimal widely-linear filtering to the observations. Remember that a widely-linear filtering is a combined linear filtering of the observations and of the conjugate complex observations [7].

The invention relates to a method of synchronizing a substantially rectilinear signal being propagated through an unknown channel, in the presence of unknown substantially rectilinear interferences, received by an array of N sensors, in which a known training sequence s(nT) is used comprising K symbols and sampled at a symbol rate T (s(nT), $0 \leq n \leq K-1$) characterized in that, based on observations $x((n+l/p)T)$ over the duration of the training sequence, where p=T/Te is an integer and Te the sampling period, a virtual observation vector $X((n+l/p)T)=[x((n+l/p)T)^T, x((n+l/p)T)^\dagger]^T$ is defined, as well as a decision criterion or decision statistic taking into account the second-order non-circular nature of the interferences, by using the first and second correlation matrices of the virtual observation vector $X((n+l/p)T)$.

For rectilinear signals, the method comprises, for example, the following steps:

acquiring observation vectors (N×1), $x((l/p+n)T)$, $0 \leq n \leq K-1$, where $T=pT_e$ is the symbol duration, p is an integer and $T_e$ the sampling period, 1 being the delay of the signal, constructing virtual observation vectors (2N×1), $X((n+l/p)T)=[x((n+l/p)T)^T, x((n+l/p)T)^\dagger]^T$, choosing L as the number of time coefficients and constructing virtual space-time observation vectors (2LN× 1), $X_{st}((n+l/p)T) \Delta [X((l/p+n+(L-1)/2)T)^T, \ldots, X((l/p+n-(L-1)/2)T)^T]^T$ if L is odd and $X_{st}((l/p+n)T) \Delta [X((l/p+n+L/2)T)^T, \ldots, X((l/p+n-L/2+1)T)^T]^T$ if L is even, determining the intercorrelation vector $\hat{r}_{X,st,s}(l)$ and the correlation matrix $\hat{R}_{X,st}(l)$ of the space-time observations, for the sampling instant l, taking into account the second correlation matrix of the vector $x((l/p+n)T)$, defining a space-time filter ST and its estimate from $\hat{R}_{X,st}(l)$ and $\hat{r}_{X,st,s}(l)$, such that $\hat{W}_{st}(l) \Delta \hat{R}_{X,st}(l)^{-1} \hat{r}_{X,st,s}(l)$, defining a synchronization criterion $\hat{C}_{NCIR-LR}(l)$ by correlating the output of the space-time filter $\hat{W}_{st}(l)$ and the training sequence, comparing the criterion $\hat{C}_{NCIR-LR}(l)$ with a threshold β set for a given false alarm probability.

The method, for two-state CPM signals, comprises a preprocessing step for derotating the received observations in order in particular to render the signal quasi-rectilinear.

The decision criterion is, for example, obtained as follows:

$$\hat{C}_{NCIR-LR}(l) \triangleq \frac{\hat{r}_{X,st,s}(l)^\dagger \hat{R}_{X,st}(l)^{-1} \hat{r}_{X,st,s}(l)}{(1/K)\sum_{n=0}^{K-1}|s(nT)|^2}$$

where the matrix (2LN×2LN) $\hat{R}_{X,st}(l)$ and the vector (2LN×1) $\hat{r}_{X,st,s}(l)$ are defined respectively by:

$$\hat{R}_{X,st}(l) \triangleq \frac{1}{K}\sum_{n=0}^{K-1} X_{st}((l/p+n)T)X_{st}((l/p+n)T)^\dagger$$

$$\hat{r}_{X,st,s}(l) \triangleq \frac{1}{K}\sum_{n=0}^{K-1} X_{st}((l/p+n)T)s(nT)^*$$

where $0 \leq \hat{C}_{NCIR-LR}(l) \leq 1$.

The invention also relates to a device for synchronizing a substantially rectilinear signal being propagated through an unknown channel, in the presence of unknown substantially rectilinear interferences, in an array of N sensors, in which a known training sequence s(nT) is used comprising K symbols and sampled at the symbol rate (s(nT), 0≦n≦K−1), characterized in that it comprises a device able to determine a decision criterion or decision statistic from observations x((n+l/p)T) over the duration of the training sequence, where p=T/Te is an integer and Te the sampling period, a virtual observation vector $X((n+l/p)T)=[x((n+l/p)T)^T, x((n+l/p)T)^\dagger]^T$, and a decision criterion or decision statistic, taking into account the second-order non-circular nature of the interferences, by using the first and second correlation matrices of the virtual observation vector X((n+l/p)T).

The device comprises, for example, an array of virtual sensors (N+1 to 2N), a filter (1), a device for correlating the signal obtained from the filter and from the training sequence, and a decision device receiving the correlated signal.

It can also comprise a device able to convert a two-state CPM signal into a quasi-rectilinear signal.

The method and the device are used, for example, to synchronize a one-dimensional modulation signal: ASK, BPSK, etc. or a two-state CPM signal of MSK, GMSK or other type.

The invention has the particular advantages of reducing, with constant performance levels, the number of sensors in reception and also makes it possible to envisage synchronization from a single antenna in the presence of an interference.

BRIEF DESCRIPTION OF THE DRAWINGS

Other characteristics and advantages of the present invention will become more apparent from reading the description that follows of an illustrative and by no means limiting example with appended figures, which represent.

Figure 1:
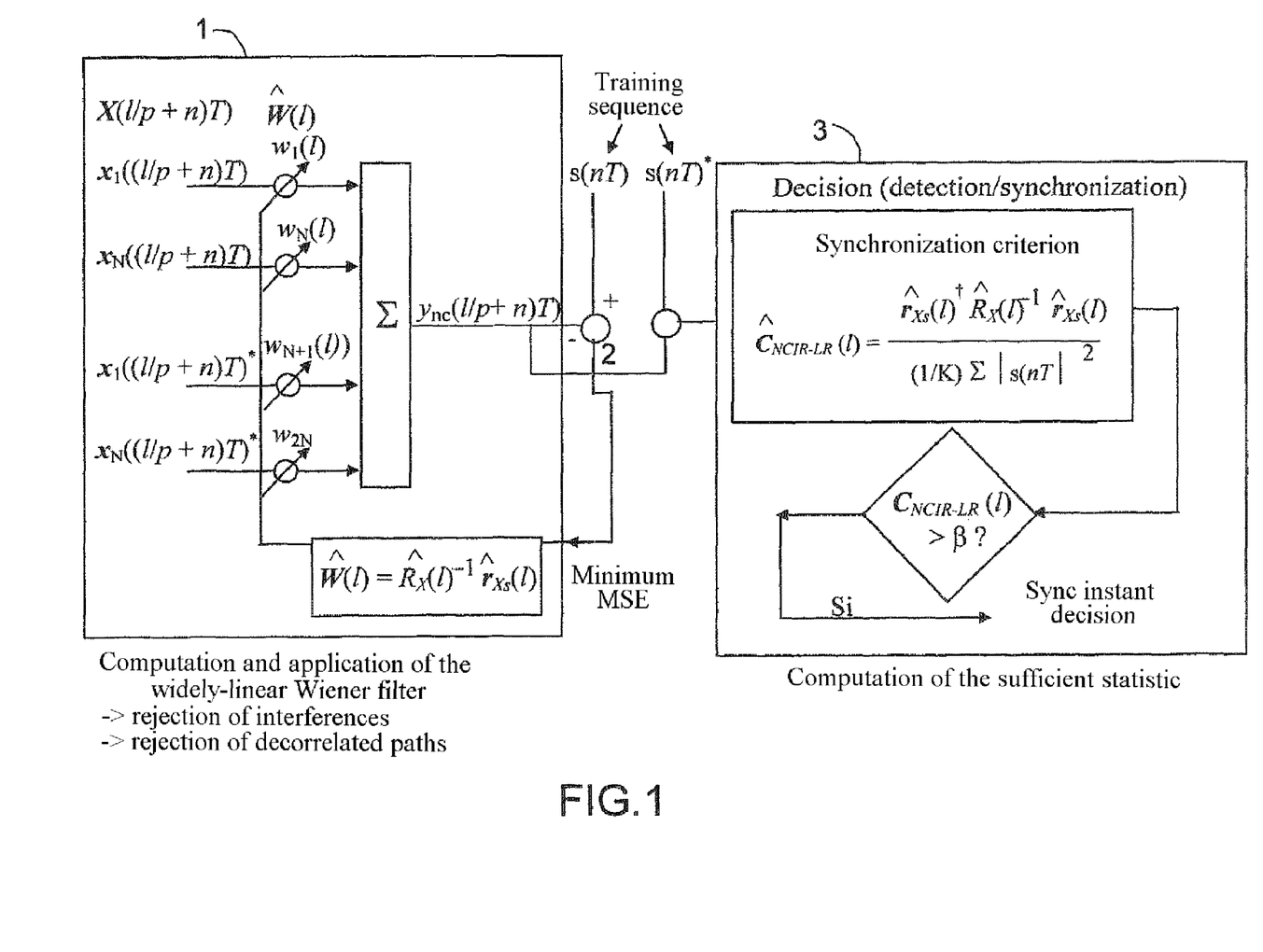
FIG. 1, a functional diagram of the synchronization device according to the invention, FIG. 2, configuration examples for optimal synchronization in the presence of a BPSK interference, FIG. 3, examples of useful and interfering constellations at the output of the filter.

FIG. 1 represents a block diagram of an exemplary device according to the invention in the case of a BPSK modulation comprising: an array of N sensors referenced 1 to N in the figure, N receiving channels, a virtual array of sensors referenced N+1 to 2N in the figure, a filter 1, a means 2 for correlating a reference signal with the signal obtained from the filter, and a decision device 3 (detection/synchronization).

The filter 1 is, for example, a LSL Wiener filter, with the particular function of rejecting interferences and rejecting decorrelated paths.

The decision device 3 is for calculating the sufficient statistic and comparing this statistic with a fixed threshold. These mechanisms are described below.

This example is given as an illustration in order to understand the invention. It is obvious that this scheme can be modified and adapted to the processing of AM, ASK, MSK or GMSK, and other signals. This list is given as an illustration.

Before detailing how the steps of the method according to the invention are implemented, some recaps and assumptions to enable it to be understood are explained.

An antenna with N narrowband (NB) sensors is considered, the antenna receiving the contribution of a rectilinear useful source, assumed to be BPSK (binary phase shift keying) modulated for simplification purposes, and a total noise consisting of rectilinear interferences and background noise. Given these assumptions, the vector, $x(kT_e)$, of the complex envelopes of the signals sampled and observed at the output of the sensors is given by:

$$x(kT_e) \approx s((k-l_o)T_e)h_s + b_T(kT_e) \quad (1)$$

where $T_e$ is the sampling period, $b_T(kT_e)$ to the sampled total noise vector, uncorrelated with the useful source, $h_s$ is the vector of the impulse responses of the channels associated with the useful signal, $l_o$ is the propagation delay of the useful signal, assumed to be equal to a multiple of $T_e$ in the interests of simplicity, and s(t) is the complex envelope of the BPSK useful signal given by:

$$s(t) = \mu_s \sum_n a_n v(t-nT) \quad (2)$$

where $a_n = \pm 1$ are random variables that are independent and identically distributed (i.i.d) corresponding to the transmitted signals, T is the symbol duration, assumed to be such that $T=pT_e$, where p is an integer, v(t) is the raised cosinusoidal formatting filter (½ Nyquist filter) and $\mu_s$ is a real value controlling the instantaneous power of s(t). It should be noted that the model (1) assumes propagation channels without time spreading, which is produced, for example, for a propagation in free space (satellite telecommunications, airport radiocommunications) or channels with flat fading (certain radiocommunication situations in an urban area). In particular, for a propagation in free space, $h_s \triangleq e^{j\phi_s}s$ where $\phi_s$ and s respectively correspond to the phase and the controlling vector of the useful signal.

However, the method explained in this document also applies to time-spread channels. In these conditions, the useful part of (1) in fact corresponds to the contribution of a path or propagation mode. The other paths are in the total noise vector.

Second-Order Statistics of the Observations

The second-order statistics, considered hereinafter to correspond to the first, $R_x(k)$, and the second, $C_x(k)$, correlation matrices of $x(kT_e)$, defined, given the above assumptions, by:

$$R_x(k) \triangleq E[x(kT_e)x(kT_e)^\dagger] \approx \pi_s(k-l_o)h_s h_s^\dagger + R(k) \quad (3)$$

$$C_x(k) \triangleq E[x(kT_e)x(kT_e)^T] \approx \pi_s(k-l_o)h_s h_s^T + C(k) \quad (4)$$

which depend on the time in as much as the BPSK useful signal is a cyclostationary signal and the total noise is also assumed to be cyclostationary with the same cyclical frequencies as the useful signal, which is in particular the case in the presence of internal interferences. In the above expressions, the sign $^\dagger$ signifies conjugate transpose, $R(k) \triangleq E[b_T(kT_e) b_T(kT_e)^\dagger]$ and $C(k) \triangleq E[b_T(kT_e) b_T(kT_e)^T]$ are respectively the first and second correlation matrices of the noise vector, $b_T(kT_e)$, $\pi_s(k) \triangleq E[|s(kT_e)|^2]$ is the instantaneous power of the useful signal received by an omnidirectional sensor for a propagation in free space.

Statement of the Problem

In a radiocommunication system, training sequences are normally transmitted periodically for synchronization purposes, which means in particular that the useful signal $s(kT_e)$ is known over intervals with a duration of K symbols, where pK is the number of samples of the training sequence. In such a context, assuming $R(k)$, $C(k)$ and $h_s$ to be unknown, the problem of optimal synchronization is to find the best estimate, $l_o$, of $l_o$ from the observation vectors $x(kT_e)$ and knowing the useful signal $s(kT_e)$ for $0 \leq k \leq pK-1$. This problem is also equivalent to finding $l=l_o$ such that the known samples $s(kT_e)$, $0 \leq k \leq pK-1$, are optimally detected from the observation vectors $x((k+l)T_e)$, $0 \leq k \leq pK-1$.

By taking the optimal synchronization instant $l_o T_e$ and considering the situation with two assumptions:

H0: presence of only total noise in $x((k+l_o)T_e)$, and H1: presence of total noise and the useful signal in $x((k+l_o)T_e)$, the following can be stated:

$$H1: x((k+l_o)T_e) \approx s((kT_e)h_s + b_T((k+l_o)T_e) \quad (5a)$$

$$H0: x((k+l_o)T_e) \approx b_T((k+l_o)T_e) \quad (5b)$$

In this context, according to the statistical theory of detection (in the Neyman Pearson sense) [8], the optimal strategy for detecting the useful signal $s(kT_e)$ from observations $x((k+l_o)T_e)$ over the duration of the training sequence, is to compare with a threshold, the likelihood ratio (RV), $L(x)(l_o)$, defined by:

$$L(x)(l_o) \triangleq \frac{p[x((k+l_o)T_e), 0 \leq k \leq pK-1, /H1]}{p[x((k+l_o)T_e), 0 \leq k \leq pK-1, /H0]} \quad (6)$$

where $p[x((k+l_o)T_e), 0 \leq k \leq pK-1/Hi]$ ($i=0, 1$) is the conditional probability density of the vector $[x(l_o T_e)^T, x((1+l_o)T_e)^T, \ldots, x((pK+l_o-1)T_e)^T]^T$ given the assumption Hi.

The idea of the invention is notably to exploit the second-order non-circular nature of the interferences while keeping the assumption of total Gaussian noise and that of the stationarity of the total noise, retaining only one total noise sample for each symbol over the duration of the sequence.

This means that, over the duration of the training sequence, only the noise vectors $b_T((l_o/p+n)T)$, $0 \leq n \leq K-1$ are considered.

Given these assumptions, the probability density of the total noise vector $b_T((l_o/p+n)T)$ is given by:

$$p[B_T((l_o/p+n)T)] \triangleq \pi^{-N} \det[R_B(l_o)]^{-1/2} \exp[-(\frac{1}{2})B_T((l_o/p+n)T)^\dagger R_B(l_o)^{-1} B_T((l_o/p+n)T)] \quad (7)$$

where $B_T((l_o/p+n)T)$ is the vector (2N×1) defined by $B_T((l_o/p+n)T) \triangleq [b_T((l_o/p+n)T)_T, b_T((l_o/p+n)T)^\dagger]^T$, and where $R_B(l_o)$ is the matrix (2N×2N) defined by:

$$R_B(l_o) \triangleq E[B_T((l_o/p+n)T) \; B_T((l_o/p+n)T)^\dagger] = \begin{pmatrix} R(l_o) & C(l_o) \\ C(l_o)^* & R(l_o)^* \end{pmatrix} \quad (8)$$

In these conditions, assuming the vectors $B_T((l_o/p+n)T)$ for $0 \leq n \leq K-1$, to be uncorrelated, the likelihood ratio RV, $L(x)$ $(l_o)$, defined by (6), becomes:

$$L(x)(l_o) \triangleq \frac{\prod_{n=0}^{K-1} p[B_T((l_o/p+n)T) = X((l_o/p+n)T) - s(nT)H_s/s(nT), H_s, R_B(l_o)]}{\prod_{n=0}^{K-1} p[B_T((l_o/p+n)T) = X((l_o/p+n)T)/R_B(l_o)]} \quad (9)$$

where the vectors (2N×1) $X((l_o/p+n)T)$ and $H_s$ (extended propagation channel vector) are respectively defined by $X((l_o/p+n)T) \triangleq [x((l_o/p+n)T)^T, x((l_o/p+n)T)^\dagger]^T$ and $H_s \triangleq [h_s^T, h_s^\dagger]^T$. The quantities $H_s$ and $R_B(l_o)$ are assumed to be unknown and must be replaced in (9) by their estimate in the maximum likelihood sense. In these conditions, it can be shown that, after a few mathematical manipulations of the expression (9), a sufficient statistic for the optimal detection of the sequence $s(nT)$ from the vectors $x((l_o/p+n)T)$, over the duration of the sequence, $0 \leq n \leq K-1$, is, for a second-order non-circular total noise, given by:

$$\hat{C}_{NCIR-LR}(l_o) \triangleq \frac{\hat{r}_{Xs}(l_o)^\dagger \hat{R}_X(l_o)^{-1} \hat{r}_{Xs}(l_o)}{(1/K) \sum_{n=0}^{K-1} |s(nT)|^2} \quad (10)$$

where the vector $\hat{r}_{Xs}(l_o)$ and the matrix $\hat{R}_X(l_o)$ are given by:

$$\hat{r}_{Xs}(l_o) \triangleq \frac{1}{K} \sum_{n=0}^{K-1} X((l_o/p+n)T) s(nT)^* \quad (11)$$

$$\hat{R}_X(l_o) \triangleq \frac{1}{K} \sum_{n=0}^{K-1} X((l_o/p+n)T) X((l_o/p+n)T)^\dagger \quad (12)$$

where $0 \leq \hat{C}_{NCIR-LR}(l_o) \leq 1$.

It can be deduced from the above results that the optimal synchronization strategy with non-circular Gaussian total noise, called optimal strategy in this document, consists in calculating, at each sampling instant $lT_e$, the expression $\hat{C}_{NCIR-LR}(l)$, defined by (10) where $l$ replaces $l_o$, and comparing the result with a threshold, which is set for a given false alarm probability. The optimal synchronization instant then corresponds to the instant $lT_e = l_o T_e$ such that $l_o$ generates the maximum value of $\hat{C}_{NCIR-LR}(l)$ out of those that exceed the threshold.

The synchronization method for the rectilinear signals comprises, for example, the following steps:

Step 0: Initialization $l=l_{min}$ ($l_{min}=0$ for example) and choice of the detection threshold $\beta$
Step 1: Estimation of $\hat{r}_{Xs}(l)$ and of $\hat{R}_X(l)$
Step 2: Calculation of the sufficient statistic $\hat{C}_{NCIR-LR}(l)$
Step 3: Comparison of $\hat{C}_{NCIR-LR}(l)$ with the threshold $\beta$
Step 4: Decision
  If $\hat{C}_{NCIR-LR}(l) < \beta$
    If $\hat{C}_{NCIR-LR}(l-1) < \beta$
      $l=l+1$
      return to step 1
    If $\hat{C}_{NCIR-LR}(l-1) \geq \beta$
      The synchronization instant is $l_o T_e$ where $l=l_o$ maximizes $\hat{C}_{NCIR-LR}(l)$ over all of the $l$ stored If $\hat{C}_{NCIR-LR}(l) \geq \beta$
  Storage of l and of $\hat{C}_{NCIR-LR}(l)$
  l=l+1
  return to step 1

So as to give a more physical interpretation to the criterion $\hat{C}_{NCIR-LR}(l)$, we introduce the widely-linear space filter $\hat{W}(l) \underline{\Delta} [\hat{w}_{nc}(l)^T, \hat{w}_{nc}(l)^\dagger]^T$ defined by $$\hat{W}(l) \underline{\Delta} \hat{R}_X(l)^{-1} \hat{r}_{Xs}(l) \tag{13}$$

By considering that the sequence s(nT) is a particular form of a random signal, the expression (13) is none other than the estimate in the least squares sense of the widely-linear space filter, $W(l) \underline{\Delta} [w_{nc}(l)^T, w_{nc}(l)^\dagger]^T \underline{\Delta} R_x(l)^{-1} r_{Xs}(l)$, which minimizes the mean square error (MSE) between the signal s(nT) and the real output $W^\dagger X((l/p+n)T) = 2Re[w^\dagger x((l/p+n)T)]$, where $W\underline{\Delta}[w^T, w^\dagger]^T$, $R_x(l)\underline{\Delta}E[X((l/p+n)T)X((l/p+n)T)^\dagger]$ and $r_{Xs}(l)\underline{\Delta}E[\overline{X}((l/p+n)T)s(nT)^*]$. In these conditions, the criterion $\hat{C}_{NCIR-LR}(l)$, defined by (10) where $l_o$ has been replaced by l, takes the following form:

$$\hat{C}_{NCIR-LR}(l)\underline{\Delta}\frac{(1/K)\sum_{n=0}^{K-1} y_{nc}((l/p+n)T)s(nT)^*}{(1/K)\sum_{n=0}^{K-1} |s(nT)|^2} = \tag{14}$$

$$\frac{\sum_{n=0}^{K-1} y_{nc}((l/p+n)T)s(nT)^*}{\sum_{n=0}^{K-1} |s(nT)|^2}$$

where $y_{nc}((l/p+n)T)$ corresponds to the output, $y_{nc}((l/p+n)T) \underline{\Delta}\hat{W}(l)^\dagger X((l/p+n)T) = 2Re[\hat{w}_{nc}(l)^\dagger x((l/p+n)T)]$, of the filter $\hat{W}(l)$ the input of which is $X((l/p+n)T)$.

In these conditions, the sufficient statistic $\hat{C}_{NCIR-LR}(l)$ corresponds, plus or minus the normalization factor, to the result of the correlation between the training sequence and the output of the LSL space filter $\hat{W}(l)$, as is illustrated in FIG. 1.

Thus, as long as l is not close to $l_o$, the sequence s(nT) is weakly correlated with the observation vector $X((l/p+n)T)$, the vector W(l) is not very far from the zero vector and the function $\hat{C}_{NCIR-LR}(l)$ approaches zero plus or minus the variance noise due to the finite duration of the training sequence.

Conversely, at the synchronization instant $l=l_o$, the sequence s(nT) is perfectly correlated with the useful part of the observation vector $X((l/p+n)T)$ given, under H1, by:

$$H1: X((l_o/p+n)T) \approx s(nT)H_s + B_T((l_o/p+n)T) \tag{15}$$

and the vector $r_{Xs}(l)$ becomes proportional to $H_s$. Then, the vector W(l) becomes proportional to the widely-linear space-matched filter, $W_s(l)\underline{\Delta}[w_{nc,s}(l)^T, w_{nc,s}(l)^\dagger]^T \underline{\Delta} R_x(l)^{-1} H_s$, which corresponds to the widely-linear space filter which maximizes the signal to interference plus noise ratio (SINR) at the output. It is easy to check that this widely-linear space-matched filter also corresponds to the conventional space-matched filter but for a virtual array of 2N sensors receiving a useful signal for which the channel vector is $H_s$ and an observed total vector noise $B_T(l_o/p+n)T)$ at the time $(l_o/p+n)T$.

One consequence of this result is that the widely-linear space-matched filter $W_s(l)$ is capable of rejecting up to P=2N−1 rectilinear interferences from an array of N sensors and, more particularly, P=1 rectilinear interference from a single sensor, hence the concept of single antenna interference cancellation (SAIC). Then, when K increases, the criterion $\hat{C}_{NCIR-LR}(l)$ for $l=l_o$ approaches the quantity $C_{NCIR-LR}(l_o)$ given by:

$$C_{NCIR-LR}(l_o)\underline{\Delta}\frac{r_{Xs}(l_o)^\dagger R_X(l_o)^{-1} r_{Xs}(l_o)}{\pi_s} = \frac{[SINR]_{nc}(l_o)}{1+[SINR]_{nc}(l_o)} \tag{16}$$

where $[SINR]_{nc}(l_o)$ is the SINR at the output of the widely-linear space-matched filter $W_s(l_o)$ at the sampling instant $l_o T_e$, defined by:

$$[SINR]_{nc}(l_o)=\pi_s H_s R_B(l_o)^{-1} H_s \tag{17}$$

Assuming a total Gaussian and orthogonally sequenced noise, the probability of correct synchronization is directly linked to the value of the parameter $\rho_{nc}=K [SINR]_{nc}(l_o)$, which is none other than the SINR at the correlation output, just before the comparison with the threshold. This result remains valid in the presence of rectilinear interferences.

Performance Characteristics

It is assumed that the total noise consists of a rectilinear interference and a background noise. In these conditions, the noise vector $b_T((l_o/p+n)T)$ takes the form:

$$b_T((l_o/p+n)T) \approx j_1((l_o/p+n)T)h_1 + b((l_o/p+n)T) \tag{18}$$

where $b((l_o/p+n)T)$ is the background noise vector at the instant $((l_o/p+n)T)$, assumed to be centered, stationary and spatially white, $h_1$ is the channel vector of the interference and $j_1((l_o/p+n)T)$ is the complex envelope of the interference at the instant $((l_o/p+n)T)$. In these conditions, the extended observation vector for the instant $((l_o/p+n)T)$, $X((l_o/p+n)T)$, can be expressed $$X((l_o/p+n)T) \approx s(nT)H_s + j_1((l_o/p+n)T)H_1 + B((l_o/p+n)T) \tag{19}$$

where $B((l_o/p+n)T)\underline{\Delta}[b((l_o/p+n)T)^T, b((l_o/p+n)T)^\dagger]^T$, $H_1 \underline{\Delta}[h_1^T, h_1^\dagger]^T$ and where the matrices R(k) and C(k), are expressed:

$$R(k) \approx \pi_1(k)h_1 h_1^\dagger + \eta_2 I \tag{20}$$

$$C(k) \approx \pi_1(k)h_1 h_1^T \tag{21}$$

where $\eta_2$ is the average power of the background noise for each sensor, I is the identity matrix (N×N) and $\pi_1(k) \underline{\Delta} E[|j_1(kT_e)|^2]$ is the power of the interference received by an omnidirectional sensor for a propagation in free space.

Given the above assumptions, the spatial correlation coefficient, $\alpha_{1s,v}$, between the interference and the useful signal for the virtual array of 2N sensors, defined by the normalized scalar product of the vectors $H_s$ and $H_1$, and such that $0 \leq |\alpha_{1s,v}| \leq 1$, is given by:

$$\alpha_{1s,v}\underline{\Delta}\frac{H_1^\dagger H_s}{(H_1^\dagger H_1)^{1/2}(H_s^\dagger H_s)^{1/2}}=|\alpha_{1s}|\cos\psi \tag{22}$$

where $\psi$ is the phase of $h_s^\dagger h_1$ and where $\alpha_{1s}$, such that $0 \leq |\alpha_{1s}| \leq 1$, is the spatial correlation coefficient between the interference and the useful signal for the real array of N sensors, defined by:

$$\alpha_{1s}\underline{\Delta}\frac{h_1^\dagger h_s}{(h_1^\dagger h_1)^{1/2}(h_s^\dagger h_s)^{1/2}}\underline{\Delta}|\alpha_{1s}|e^{-j\psi} \tag{23}$$

The expression (22) shows that the virtual array associated with an array with space diversity is an array with space and phase diversity. Similarly, the virtual array associated with an array with space, pattern and polarization diversity is an array with space, pattern, polarization and phase diversity. One consequence of this result, proven by the fact that $|\alpha_{1s,v}|=|\alpha_{1s}| |\cos \psi| \leq |\alpha_{1s}|$, is that the widely-linear space-matched filter (FAS LSL) discriminates the sources better than the space-matched filter and makes it possible in particular to reject single-sensor interference by phase discrimination. In particular, the SINR at the output of the widely-linear space-matched filter $W_s(l_o)$, defined by (17), takes the form:

$$[SINR]_{nc}(l_o) = 2\epsilon_s \left[1 - \frac{2\epsilon_1}{1+2\epsilon_1}|\alpha_{1s}|^2 \cos^2\psi\right] \quad (24)$$

where $\epsilon_s \Delta (h_s^\dagger h_s) \pi_s/\eta_2$ and $\epsilon_1 \Delta (h_1^\dagger h_1) \pi_1/\eta_2$. The expression (24) shows that $[SINR]_{nc}(l_o)$ is a decreasing function of $\cos^2\psi$, $|\alpha_{1s}|^2$ and $\epsilon_1$, taking its minimum value in the absence of spatial discrimination between the useful signal and the interference ($|\alpha_{1s}|=1$), which is produced in particular for a single-sensor reception. In these conditions, for a strong interference ($\epsilon_1 \gg 1$), the expression (24) takes the form:

$$[SINR]_{nc}(l_o) \approx 2\epsilon_s[1-\cos^2\psi] \quad (25)$$

an expression independent of $\epsilon_1$, controlled by $2\epsilon_s$ and $\cos^2\psi$, and showing a capacity to reject rectilinear interference by phase discrimination as long as $\psi \neq 0+k\pi$, i.e. as long as there is a phase discrimination between the useful signal and the interference, with a degradation of the performance characteristics compared to the situation in the absence of interference increasing with $\cos^2\psi$.

Figure 2:
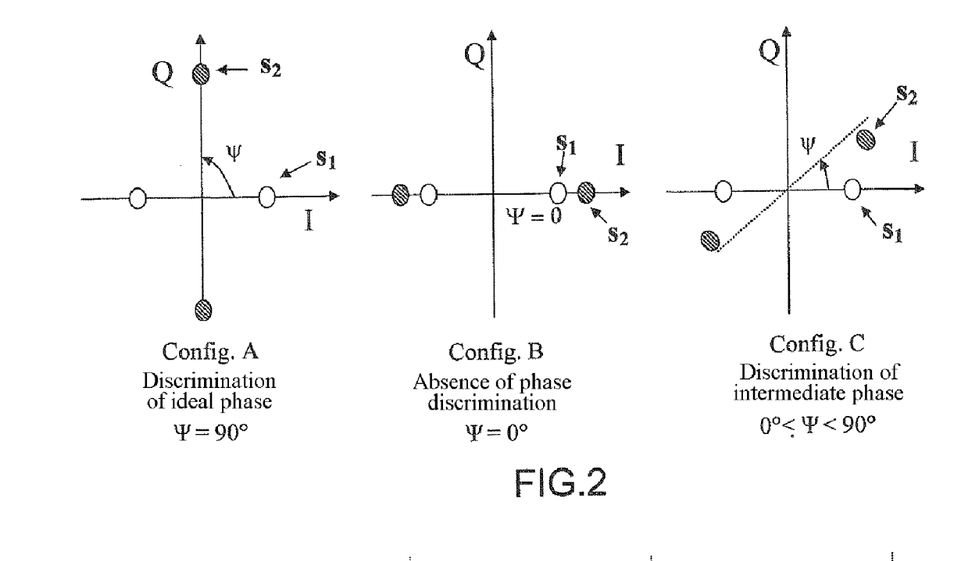

Examples of favorable, unfavorable and intermediate situations relating to the differential phase $\psi$ are illustrated in FIG. 2 for a propagation in free space and a BPSK interference.

Figure 3:
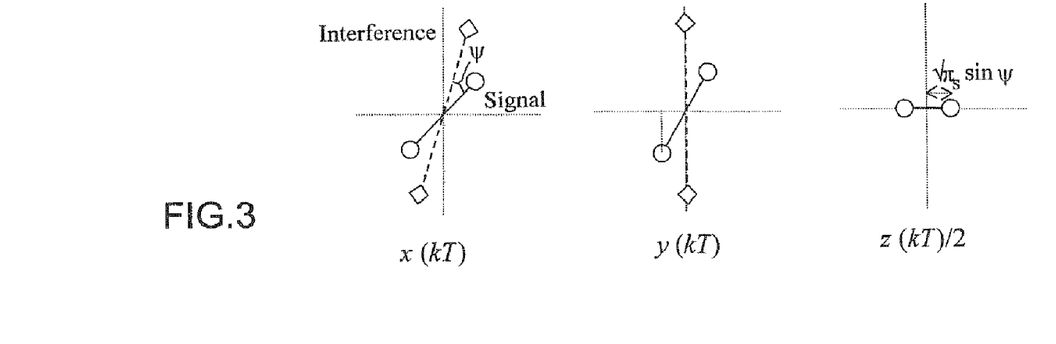

Furthermore, FIG. 3 illustrates the operation of the widely-linear space-matched filter in the presence of a strong BPSK interference, which compensates the phase of the interference and phase shifts that of $\pi/2$ so as to minimize the contribution of the interference on the real part axis.

According to one variant of embodiment, the method according to the invention is applied in particular to the GMSK modulation belonging to the family of continuous phase modulations (CPM). It is shown in [6] that the GMSK modulation can be approximated by a linear modulation, generating the approximate useful complex envelope:

$$s(t) = \mu_s \sum_n j^n b_n f(t-nT) \quad (26)$$

where $b_n=\pm 1$ are random i.i.d variables corresponding to the transmitted symbols if the symbols are differentially encoded in the exact form of the modulation, T is the symbol duration and f(t) the real value shaping filter which corresponds either to the main pulse in the Laurent breakdown or the best pulse in the least squares sense, for example. In both cases, the time bearer of f(t) is approximately 4T and the sampled version of f(t) at the symbol rate generates only three non-zero values corresponding to f(0), the maximum value of f(t), and two non-zero secondary values, f(T) and f(−T), such that f(T)=f(−t)<f(0). The derotation operation involves multiplying the sample, s(nT), of s(t) by $j^{-n}$, generating the derotated sampled signal, $s_d(nT)$, defined by:

$$s_d(nT) \Delta j^{-n} s(nT) = \mu_s \sum_m j^{m-n} b_m f((n-m)T) \Delta \mu_s \sum_m b_m f_d((n-m)T) \quad (27)$$

where $f_d(t) \Delta j^{-t/T} f(t)$ is the equivalent shaping filter of the linearized and derotated GMSK signal. It can be deduced from (27) that $s_d(nT)$ has the form of a BPSK signal sampled at the symbol rate but with two differences compared to BPSK. The first lies in the fact that $f_d(t)$ is not a ½ Nyquist filter and that the inter-symbol interference (ISI) appears after a filtering operation matched to the filter $f_d(t)$. The second lies in the fact that $f_d(t)$ is no longer a function with real values but becomes a function with complex values.

Extended Observation Vector

To simplify the analysis, a useful signal and a GMSK interference that are synchronized are considered. In these conditions, the observation vector sampled at the symbol rate and derotated is expressed, for the synchronization instant $l_o T_e$, $$x_d((l_o/p+n)T) \Delta j^{-n}x((l_o/p+n)T) \approx j^{-n}s(nT)h_s+j^{-n}j_1(nT)h_1+j^{-n}b((l_o p+n)T) \quad (28)$$

By inserting (27) into (28), we obtain:

$$x_d((l_o/p+n)T) \approx \mu_s[f(0)b_n+jf(-T)b_{n+1}-jr(T)b_{n-1}]h_s+\mu_1[f(0)b_n^1+jf(-T)b_{n+1}^1-jr(T)b_{n-1}^1]h_1+j^{-n}b((l_o/p+n)T) \quad (29)$$

where $\mu_1$ controls the amplitude of the interference and where $b_n^1$ is the symbol n of the interference. From (29), it is possible to deduce the expression of the extended derotated observation $X_d((l_o/p+n)T) \Delta [x_d((l_o/p+n)T)^T, x_d((l_o/p+n)T)^\dagger]^T$, given by:

$$X_d((l_o/p+n)T) \approx \mu_s f(0) b_n H_s + \mu_s[f(-T)b_{n+1}-f(T)b_{n-1}] JH_s + \mu_1 f(0) b_n^1 H1 + \mu_1 [(-T)b_n^1_{+1}-f(T)b_n^1_{-1}] JH_1 + B_d((l_o/p+n)T) \quad (30)$$

where $B_d((l_o/p+n)T) \Delta [j^{-n}b((l_o/p+n)T)^T, j^n b((l_o/p+n)T)^\dagger]^T$ and J is the matrix $(2N \times 2N)$ defined by:

$$J \Delta j \begin{pmatrix} I & O \\ O & -I \end{pmatrix} \quad (31)$$

where I and O are respectively the identity and zero matrices $(N \times N)$. Comparing (30) and (19), it can be deduced that, unlike the BPSK sources, a derotated GMSK source i (useful (i=s) or interfering (i=1)) generates, in the extended observation vector, $X_d((l_o/p+n)T)$, two statistically independent sources of powers $\pi_{i1}\Delta\mu_i^2 f(0)^2$ and $\pi_{i2}\Delta\mu_i^2[f(-T)^2+f(T)^2]$ and of channel vectors given respectively by $H_i$ and $JH_i$, such that $H_i^\dagger JH_i=0$.

Limitations of the Widely-Linear Space Filters

It can be deduced from the above result that two degrees of freedom are necessary to process a derotated GMSK interference from $X_d((l_o/p+n)T)$. Thus, while considering space filters $(y((l_o/p+n)T)\Delta W^\dagger X_d((l_o/p+n)T))$, the number of virtual sensors must remain at least greater than the number of interferences generated (2N>2P), which eliminates the interest of the optimal widely-linear filters. However, in as much as the two interferences generated in (30) are two different filtered versions of one and the same source, the problem of the rejection of these two interferences is similar to the problem of the rejection of an interference having passed through a multiple-path propagation channel. In these conditions, the problem can be resolved by replacing the widely-linear space filters with widely-linear space-time filters.

Synchronization Using Widely-Linear Space-Time Filters

A widely-linear space-time filter (ST LSL) with L coefficients for each filter generates, at the synchronization instant $l_o T_e$, the output $y((l_o/p+n)T)$ defined by:

$$y((l_o/p+n)T) \triangleq \sum_{q=-(L-1)/2}^{(L-1)/2} W_q^\dagger X_d((l_o/p+n-q)T) \triangleq W_{st}^\dagger X_{d,st}((l_o/p+n)T) \quad (32)$$

if L is odd and $$y((l_o/p+n)T) \triangleq \sum_{q=-L/2}^{L/2-1} W_q^\dagger X_d((l_o/p+n-q)T) \triangleq W_{st}^\dagger X_{d,st}((l_o/p+n)T) \quad (33)$$

if L is even, where the vectors (2LN×1) $W_{st}$ and $X_{d,st}((l_o/p+n)T)$ are defined respectively by $W_{st} \triangleq [W_{-(L-1)/2}^T, \ldots, W_{(L-1)/2}^T]^T$ and $X_{d,st}((l_o/p+n)T) \triangleq [\overline{X}_d((l_o/p+n+(L-1)/2)T)^T, \ldots, X_d((l_o/p+n-(L-1)/2)T)^T]^T$ if L is odd and $W_{st} \triangleq [W_{-L/2}^T, \ldots, W_{L/2-1}^T]^T$ and $X_{d,st}((l_o/p+n)T) \triangleq [\overline{X}_d((l_o/p+n+L/2)T)^T, \ldots, X_d((l_o/p+n-L/2+1)T)^T]^T$ if L is even.

In these conditions, the proposed procedure for synchronizing a GMSK signal in the presence of GMSK interferences is similar to that proposed for the BPSK signals in section 5, but where the widely-linear space filter (2N×1)$\hat{W}(l)$, defined by (13), is replaced by the widely-linear space-time filter (2LN×1), $\hat{W}_{st}(l)$, defined by:

$$\hat{W}_{st}(l) \triangleq \hat{R}_{Xd,st}(l)^{-1} \hat{r}_{Xd,st,s}(l) \quad (34)$$

where the matrix (2LN×2LN)$\hat{R}_{Xd,st}(l)$ and the vector (2LN×1)$\hat{r}_{Xd,st,s}(l)$ are defined respectively by:

$$\hat{R}_{Xd,st}(l) \triangleq \frac{1}{K}\sum_{n=0}^{K-1} X_{d,st}((l/p+n)T)X_{d,st}((l/p+n)T)^\dagger \quad (35)$$

$$\hat{r}_{Xd,st,s}(l) \triangleq \frac{1}{K}\sum_{n=0}^{K-1} X_{d,st}((l/p+n)T)s(nT)^* \quad (36)$$

In these conditions, the sufficient statistic tested at the instant $lT_e$ is expressed:

$$\hat{C}_{NCIR-LR}(l) \triangleq (1/K)\sum_{n=0}^{K-1} y_{nc,st}((l/p+n)T)s(nT)^*; \quad (37)$$

$$= (1/K)\sum_{n=0}^{K-1} |s(nT)|^2$$

$$= \sum_{n=0}^{K-1} y_{nc,st}((l/p+n)T)s(nT)^* \sum_{n=0}^{K-1} |s(nT)|^2$$

where $y_{nc,st}((l/p+n)T)$ corresponds to the output, $y_{nc,st}((l/p+n)T) \triangleq \hat{W}_{st}(l)^\dagger X_{d,st}((l/p+n)T)$, of the filter $\hat{W}_{st}(l)$, the input of which is $X_{d,st}((l/p+n)T)$. This sufficient statistic $\hat{C}_{NCIR-LR}(l)$ corresponds, plus or minus the normalization factor, to the result of the correlation between the training sequence and the output of the widely-linear space-time filter $\hat{W}_{st}(l)$.

The expression (37) can also be expressed:

$$\hat{C}_{NCIR-LR}(l) \triangleq \frac{\hat{r}_{Xd,st,s}(l)^\dagger \hat{R}_{Xd,st}(l)^{-1} \hat{r}_{Xd,st,s}(l)}{(1/K)\sum_{n=0}^{K-1} |s(nT)|^2} \quad (38)$$

The steps of the method for the GMSK signals are summarized below:
Step 0: Initialization $l=l_{min}$ ($l_{min}=0$ for example) and choice of the detection threshold β
Step 1: Derotation of the observations and construction of the space-time observation vectors (2LN×1)$X_{d,st}((l/p+n)T)$, 0≦n≦K−1
Step 2: Estimation of $\hat{r}_{Xd,st,s}(l)$ and of $\hat{R}_{Xd,st}(l)$
Step 3: Calculation of the sufficient statistic $\hat{C}_{NCIR-LR}(l)$, defined by (38)
Step 4: Comparison of $\hat{C}_{NCIR-LR}(l)$ with the threshold β
Step 5: Decision
If $\hat{C}_{NCIR-LR}(l)<\beta$
If $\hat{C}_{NCIR-LR}(l-1)<\beta$
l=l+1
return to step 1
If $\hat{C}_{NCIR-LR}(l-1)\geqq\beta$
The synchronization instant is $l_o T_e$ where $l=l_o$ maximizes $\hat{C}_{NCIR-LR}(l)$ over all of the l stored
If $\hat{C}_{NCIR-LR}(l)\geqq\beta$
Storage of l and of $\hat{C}_{NCIR-LR}(l)$
l=l+1
return to step 1

It is possible to show that, in the presence of P GMSK interferences, a sufficient condition for rejecting all the interferences (including the inter-symbol interferences) at the output of the filter $\hat{W}_{st}(l_o)$ is that the following condition should be met:

$$P < \frac{L(2N-1)-2}{L+3} \quad (39)$$

which generates the sufficient condition P<2N−1 for L that is infinitely great and which shows at the same time the possibility of processing, using the optimal widely-linear space-time filters (ST LSL) and for N>1, a number of GMSK interferences at least equal to 2(N−1) from N sensors and therefore two times greater than could be envisaged with a conventional processing. However, this condition is only sufficient and does not take account, for example, of the fact that the correlation operation between the output $y_{nc,st}((l_o/p+n)T)$ and the sequence s(nT) provides an additional SINR gain of the order of K. Because of this, a rejection under the background noise of all the interference sources at the output of the filter $\hat{W}_{st}(l_o)$ is not necessarily needed on synchronization. In these conditions, a limited number of coefficients (L=3 or 5) can be used to obtain very good results in numerous situations inherent to the GSM network context, including for N=P=1.

The optimal widely-linear space-time filters can also prove advantageous for synchronizing BPSK signals, particularly when the propagation delay is not a multiple of the sampling period.

The method described above applies for all types of propagation channels (time-spread or not).

REFERENCES

[1] S. BENSLEY, B. AAZHANG, "Subspace-based channel estimation for CDMA system, *IEEE Trans Communication*, Vol 44, pp. 1009-1020, August 1996

[2] S. BENSLEY, B. AAZHANG, "Maximum Likelihood synchronization of a single user for CDMA systems, *IEEE Trans Communication*, Vol 46, pp. 392-399, March 1998
[3] L. E. BRENNAN, I. S. REED, "An adaptive array signal processing algorithm for communications", *IEEE Trans. Aerosp. Electronic Systems*, Vol 18, No 1, pp. 124-130, January 1982.
[4] R. T. COMPTON, "An adaptive array in a spread spectrum communication system", *Proc IEEE*, Vol 66, No 3, pp. 289-298, March 1978
[5] D. M. DUGLOS, R. A. SCHOLTZ, "Acquisition of spread spectrum signals by an adaptive array", *IEEE Trans. Acou. Speech. Signal Proc.*, Vol 37, No 8, pp. 1253-1270, August 1989.
[6] P. A. LAURENT, "Exact and approximate construction of digital phase modulations by superposition of amplitude modulated pulses (AMP)", *IEEE Trans. on Communications*, Vol 34, No 2, pp. 150-160, February 1986.
[7] B. PICINBONO, P. CHEVALIER, "Widely linear estimation with complex data", *IEEE Trans. Signal Processing*, Vol 43, No 8, pp. 2030-2033, August 1995.
[8] H. L. VAN TREES, "Detection, Estimation and Modulation Theory", *John Wiley and Sons*, 1971.
[9] J. H. WINTERS, "Spread spectrum in a four phase communication system employing adaptive antennas", *IEEE Trans. On Communications*, Vol 30, No 5, pp. 929-936, May 1982.

The invention claimed is:

1. A method comprising:
synchronizing a substantially rectilinear signal being propagated through an unknown channel, in the presence a presence of unknown substantially rectilinear interferences, received by an array of N sensors, in which a known training sequence s(nT) is used comprising K symbols and sampled at a symbol rate T (s(nT), $0 \leq n \leq K-1$) wherein, based on observations $x((n+l/p)T)$ over a duration of the training sequence, where $p=T/Te$ is an integer and Te the sampling period, l is the delay of the signal, a virtual observation vector $X((n+l/p)T)=[x((n+l/p)T)^T, x((n+l/p)T)^{\dagger}]^T$ is defined, where $\dagger$ is the conjugate transpose, as well as a decision criterion or decision statistic taking into account a second-order non-circular nature of the interferences, by using first and second correlation matrices of the virtual observation vector $X((n+l/p)T)$.

2. The synchronization method as claimed in claim 1, comprising the following steps, for rectilinear signals:
acquiring observation vectors (N×1), $x((l/p+n)T)$, $0 \leq n \leq \tilde{K}1$, where $T=pTe$ is the symbol duration, p is an integer and Te the sampling period, l being the delay of the signal,
constructing virtual observation vectors (2N×1), $X((n+l/p)T)=[x((n+l/p)T)T, x((n+l/p)T)\dagger]T$,
choosing L as the number of time coefficients and constructing virtual space-time observation vectors (2LN× 1), $X_{st}((n+l/p)T)\underline{\Delta}[X((l/p+n+(L-1)/2)T)^T, \ldots, X((l/p+\tilde{n}(L-1)/2)T)^T]^T$ if L is odd and $X_{st}((l/p+n)T) \underline{\Delta}[X((l/p+n+L/2)T)^T, \ldots, X((l/p+\tilde{n}L/2+1)T)^T]^T$ if L is even,
determining an intercorrelation vector $\hat{r}_{X,st,s}(l)$ and a correlation matrix $\hat{R}_{X,st}(l)$ of the space-time observations, for the sampling instant l, taking into account the second correlation matrix of the vector $x((l/p+n)T)$,
defining a space-time filter ST and its estimate from $\hat{R}_{X,st}(l)$ and $\hat{r}_{X,st,s}(l)$, such that $\hat{W}_{st}(l) \underline{\Delta} \hat{R}_{X,st}(l) \hat{r}_{X,st,s}(l)$, defining a synchronization criterion e $\hat{C}_{NCIR-LR}(l)$ by correlating the output of the space-time filter $\hat{W}_{st}(l)$ and the training sequence,
comparing the criterion $\hat{C}_{NCIR-LR}(l)$ with a threshold $\beta$ set for a given false alarm probability.

3. The method as claimed in claim 1, comprising, for two-state CPM signals, a preprocessing step for derotating the received observations.

4. The method as claimed in claim 2, wherein:

$$\hat{C}_{NCIR-LR}(l) \underline{\Delta} \frac{\hat{r}_{X,st,s}(l)^{\dagger} \hat{R}_{X,st}(l)^{-1} \hat{r}_{X,st,s}(l)}{(1/K) \sum_{n=0}^{K-1} |s(nT)|^2}$$

where the matrix (2LN×2LN) $\hat{R}_{X,st}(l)$ and the vector (2LN×1) $\hat{r}X,st,s(l)$ are defined respectively by:

$$\hat{R}_{X,st}(l) \underline{\Delta} \frac{1}{K} \sum_{n=0}^{K-1} X_{st}((l/p+n)T) X_{st}((l/p+n)T)^{\dagger}$$

$$\hat{r}_{X,st,s}(l) \underline{\Delta} \frac{1}{K} \sum_{n=0}^{K-1} X_{st}((l/p+n)T) s(nT)^*$$

where $0 \leq \hat{C}_{NCIR-LR}(l) \leq 1$.

5. The method as claimed in claim 3, comprising synchronizing a two-state CPM signal, wherein the two-state CPM signal is MSK or GMSK.

6. The method as claimed in claim 1, comprising synchronizing a one-dimensional modulation signal, wherein the one-dimensional modulation signal is ASK or BPSK.

7. A device for synchronizing a substantially rectilinear signal being propagated through an unknown channel, in the presence a presence of unknown substantially rectilinear interferences, in an array of N sensors, in which a known training sequence s(nT) is used comprising K symbols and sampled at the symbol rate (s(nT), $0 \leq n \leq K-1$), comprising:
a device able to determine a decision criterion or decision statistic from observations $x((n+l/p)T)$ over a duration of the training sequence, where $p=T/Te$ is an integer and Te the sampling period, I is the delay of the signal, a virtual observation vector $X((n+l/p)T)=[x((n+l/p)T)^T, x((n+l/p)T)^{\dagger}]^T$ is defined, where $\dagger$ is the conjugate transpose, and a decision criterion or decision statistic, taking into account a second-order non-circular nature of the interferences, by using first and second correlation matrices of a virtual observation vector $X((n+l/p)T)$.

8. The device as claimed in claim 7, comprising an array of virtual sensors (N+1 to 2N), a filter (1), a device for correlating the signal obtained from a filter and from the training sequence, and a decision device receiving the correlated signal.

9. The device as claimed in claim 7, comprising a device for converting a two-state CPM signal into a quasi-rectilinear signal.

10. The device as claimed in claim 7, wherein the device synchronizes a one-dimensional modulation signal, and said one-dimensional modulation signal is ASK or BPSK.

11. The device as claimed in claim 9, wherein the device synchronizes a two-state CPM signal, and the two-state CPM signal is MSK or GMSK.

* * * * *